US009872555B2

(12) United States Patent
Calman et al.

(10) Patent No.: US 9,872,555 B2
(45) Date of Patent: *Jan. 23, 2018

(54) MAGNETIC BELT ASSEMBLY

(71) Applicant: Geek Wraps, Inc., Oakland Park, FL (US)

(72) Inventors: Kenneth J. Calman, Fort Lauderdale, FL (US); Kathryn S. Calman, Fort Lauderdale, FL (US)

(73) Assignee: Geek Wraps, Inc., Oakland Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,345

(22) Filed: Jan. 25, 2017

(65) Prior Publication Data

US 2017/0127813 A1   May 11, 2017

Related U.S. Application Data

(63) Continuation-in-part of application No. 14/330,362, filed on Jul. 14, 2014, now Pat. No. 9,687,067.

(60) Provisional application No. 61/957,912, filed on Jul. 13, 2013.

(51) Int. Cl.
| | |
|---|---|
| A45F 5/02 | (2006.01) |
| A45C 11/36 | (2006.01) |
| A45C 13/10 | (2006.01) |
| H01F 7/02 | (2006.01) |
| F16B 1/00 | (2006.01) |
| A41F 1/00 | (2006.01) |
| A41F 9/00 | (2006.01) |

(52) U.S. Cl.
CPC .............. *A45F 5/021* (2013.01); *A45C 11/36* (2013.01); *A45C 13/1069* (2013.01); *H01F 7/0252* (2013.01); *A41F 1/002* (2013.01); *A41F 9/002* (2013.01); *A45F 2200/0566* (2013.01); *A45F 2200/0575* (2013.01); *F16B 2001/0035* (2013.01); *Y10T 24/13* (2015.01); *Y10T 24/32* (2015.01)

(58) Field of Classification Search
CPC .............. A45F 5/021; A45F 2200/0575; A45F 2200/0566; F16B 2001/0035; A45C 11/36; A45C 13/1069; H01F 7/0252; Y10T 24/13; Y10T 24/32; A41F 1/002; A41F 9/002

See application file for complete search history.

(56) References Cited

U.S. PATENT DOCUMENTS

| | | | | | |
|---|---|---|---|---|---|
| 4,308,155 | A | * | 12/1981 | Tada | H01F 1/113 106/459 |
| 4,408,706 | A | * | 10/1983 | Hurley | B26B 29/025 224/192 |
| 5,201,448 | A | * | 4/1993 | Schue | B25H 3/00 2/300 |
| D350,849 | S | * | 9/1994 | Dancyger | D3/224 |

(Continued)

*Primary Examiner* — Corey Skurdal
(74) *Attorney, Agent, or Firm* — Ice Miller LLP

(57) ABSTRACT

A magnetic belt assembly is provided. The assembly includes a first belt portion having a first coupling member and a second belt portion having a second coupling member. Each of the first coupling member and the second coupling member includes a plurality of magnets that is structurally flexible such that each magnet of the plurality of magnets is angularly positionable relative to each other magnet of the plurality of magnets to form a non-planar surface.

20 Claims, 8 Drawing Sheets

(56) References Cited

U.S. PATENT DOCUMENTS

2009/0289090 A1\* 11/2009 Fullerton .................. A45F 5/02
224/183

\* cited by examiner

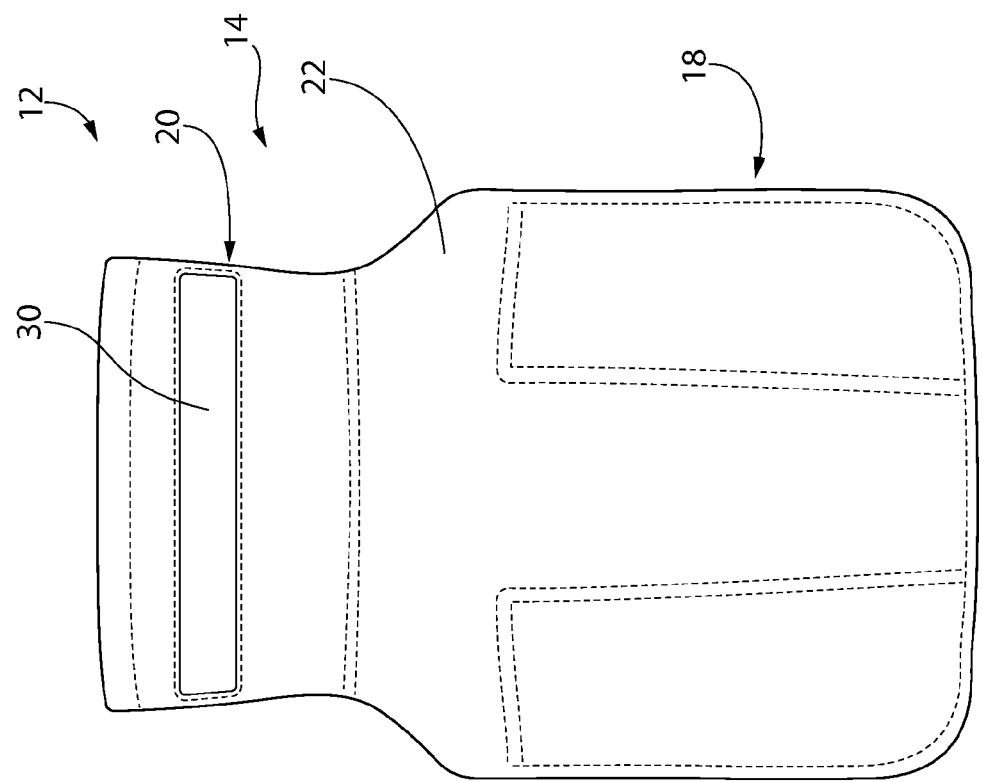
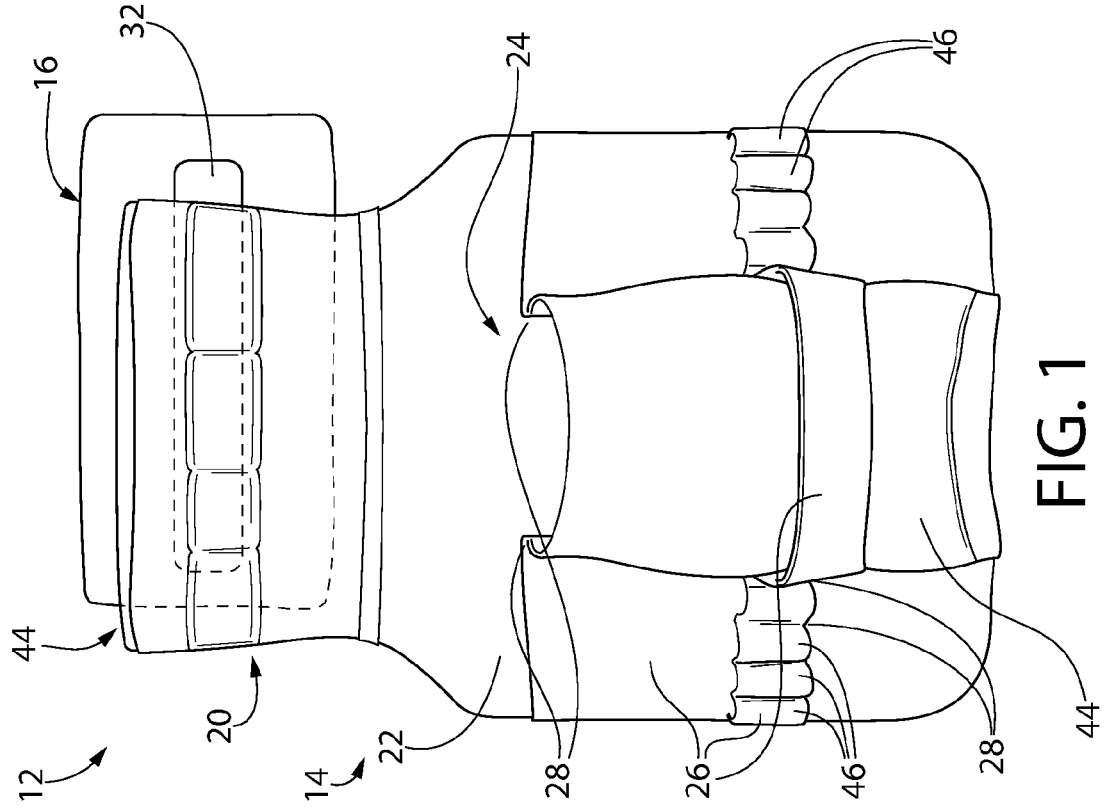

MAGNETIC BELT ASSEMBLY

RELATED APPLICATION DATA

This application is a continuation-in-part of U.S. patent application Ser. No. 14/330,362 filed Jul. 14, 2014, which claims benefit to U.S. Provisional Application No. 61/957,912 filed Jul. 13, 2013, each of which is hereby incorporated in their entirety herein by reference.

FIELD OF THE DISCLOSURE

The present disclosure relates to magnetic assemblies and, in particular, to magnetic belt assemblies.

BACKGROUND OF THE DISCLOSURE

Craftsmen in industries such as the vehicle wrap, automotive paint protection, automotive bed liner, home decor, automotive sign and graphics, woodworking, and construction industries, as well as any industry professional that uses small tools during the performance of his or her job, require easy and efficient access to the tools of their trade. Particularly in the adhesive wrap industry, a graphics installer applies adhesive sheet materials or tape to the exterior of a vehicle, watercraft, aircraft, or any other surface to be covered. A variety of tools and supplies are utilized to apply the adhesive sheet materials or tape including squeegees of varying size, type, or function, levels, tape measures, screw drivers, wrenches, nails, pencils, knives, razors, scissors, and tape reels. The graphics installer must move to various stations or locations of the vehicle or surface, including locations that are very low to the ground or that have very little space for installer movement. Conventional tool belts or other holders are too bulky to be utilized in the tight spaces in which graphics installers must operate. Further, conventional belts and holders are not easily removed in such tight spaces and installers cannot reposition or easily reattach the conventional belts or holders as installation moves to different areas of the work surface.

Therefore, there remains a need for a belt assembly that is quickly and easily removed. Additionally, there remains a need for a belt assembly that allows one or more objects to be quickly and easily attached thereto. Further, there remains a need for a belt assembly that is capable of being reattached at another location, such as a vehicle surface, to allow installers to access necessary tools for completion of the adhesive wrap work.

SUMMARY OF THE DISCLOSURE

In accordance with an aspect of the disclosure, a magnetic belt assembly is provided. The belt assembly includes a first belt portion having a first coupling member, and a second belt portion having a second coupling member, wherein each of the first coupling member and the second coupling member comprises a plurality of magnets that is structurally flexible such that each magnet of the plurality of magnets is angularly positionable relative to each other magnet of the plurality of magnets to form a non-planar surface.

The first belt portion may define a first end of the magnetic belt assembly. The second belt portion may define a second end of the magnetic belt assembly. The second belt portion may define a connecting portion of the magnetic belt assembly between the first end and a second end of the magnetic belt assembly. The first belt portion may include a first layer and a second layer, the first layer being coupled to the second layer to embed the first coupling member therebetween. The second belt portion may include the first layer and the second layer, the first layer being coupled to the second layer to embed the second coupling member therebetween. The first layer may be coupled to the second layer between two adjacent magnets. The belt assembly may further include an internal cavity between the first layer and the second layer, the internal cavity extending continuously from the first end of the magnetic belt assembly to the second end of the magnetic belt assembly. The first layer and the second layer may be sewn together continuously from the first end to the second end to form the internal cavity. The plurality of magnets may extend from a first end of the magnetic belt assembly to a second end of the magnetic belt assembly. The non-planar surface may be formed by each magnet of the plurality of magnets being split from each other magnet of the plurality of magnets. Each magnet of the plurality of magnets may be arranged in a varied polarity array such that two magnets that are angularly positionable to form a non-planar surface are positioned in the array with reversed polarity relative to the other. Each of the plurality of magnets may be inflexible.

In accordance with an aspect of the present disclosure, a magnetic belt assembly is provided. The belt assembly includes a first belt portion defining a first end of the magnetic belt assembly and having a first coupling member, a second belt portion defining a second end of the magnetic belt assembly and having a second coupling member, and a third belt portion connecting the first end of the magnetic belt assembly to the second end of the magnetic belt assembly and having a third coupling member. Each of the first coupling member, the second coupling member, and the third coupling member comprises a plurality of magnets that is structurally flexible such that each magnet of the plurality of magnets is angularly positionable relative to and split from each other magnet of the plurality of magnets to form a non-planar surface.

The assembly may further include an internal cavity extending from the first end of the magnetic belt assembly to the second end of the magnetic belt assembly. The plurality of magnets may be disposed within the internal cavity and extend from the first end of the magnetic belt assembly to the second end of the magnetic belt assembly. The internal cavity may be formed by a first layer defining a first planar side of the magnetic belt assembly and being coupled to a second layer defining a second planar side of the magnetic belt assembly. A first layer and a second layer may be sewn together continuously from the first end to the second end to form the internal cavity. Each magnet of the plurality of magnets may be arranged in a varied polarity array such that two magnets that are angularly positionable to form the non-planar surface are positioned in the array with reversed polarity relative to the other. Each magnet of the plurality of magnets may be inflexible.

BRIEF DESCRIPTION OF THE FIGURES

While the specification concludes with claims particularly pointing out and distinctly claiming the present disclosure, the present disclosure will be better understood from the following description in conjunction with the accompanying Drawing Figures, in which like reference numerals identify like elements, and wherein:

FIG. 1 is a front perspective view of a holding member or removable member of an attachment assembly in accordance with aspects of the present disclosure;

FIG. 2 is a rear perspective view of a holding member or removable member of an attachment assembly in accordance with further aspects of the present disclosure;

DETAILED DESCRIPTION

Figure 3:
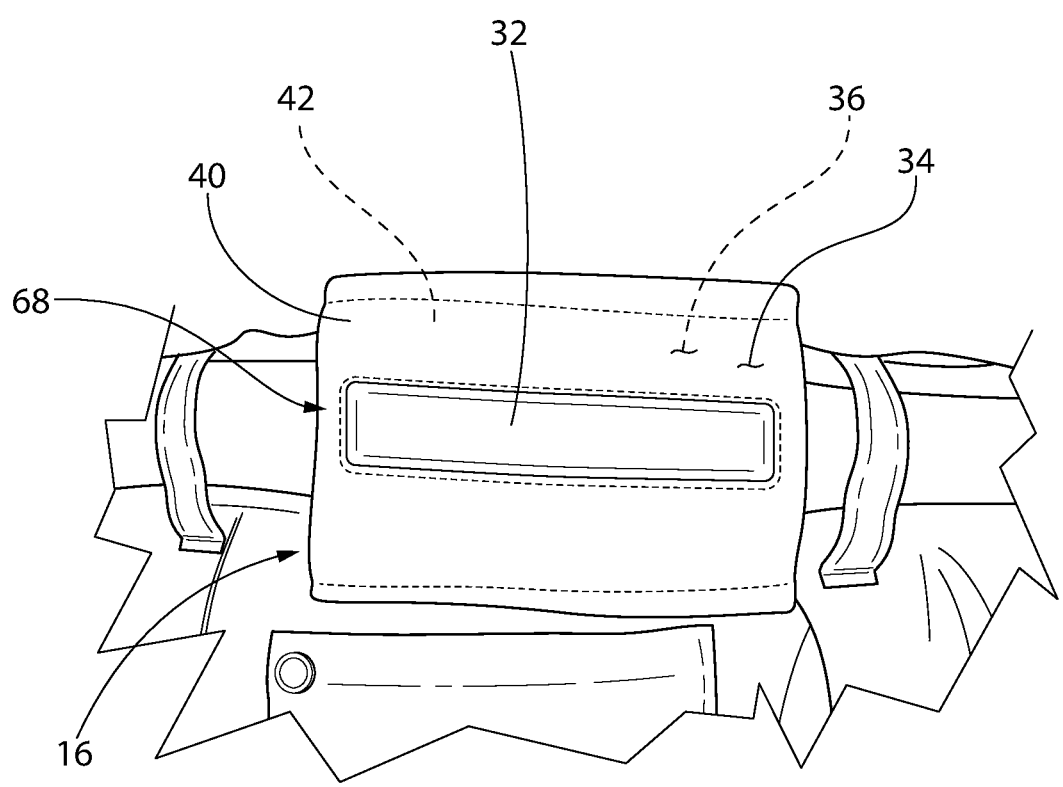
FIG. 3 is a front perspective view of an attachment member of an attachment assembly in accordance with further aspects of the present disclosure.

In the following detailed description of the preferred embodiment, reference is made to the accompanying drawings that form a part hereof, and in which is shown by way of illustration, and not by way of limitation, a specific preferred embodiment in which the disclosure may be practiced. It is to be understood that other embodiments may be utilized and that changes may be made without departing from the spirit and scope of the present disclosure.

Reference is now made to FIG. 1, which shows an attachment assembly 12 in accordance with a preferred embodiment of the present disclosure. The attachment assembly 12 shown in FIG. 1 includes a holding member 14, also referred to herein as a removable member 14, and an attachment member 16. The holding member 14 includes a main portion 18 having a body 22 that is substantially planar as shown in FIG. 1 and further shown in FIG. 2, extending downward from an upper portion 20 of the holding member 14. In the preferred embodiment shown in FIG. 1, the core of the upper portion 20, the main portion 18, and the body 22 is comprised of saddle leather to permit flexibility while remaining durable. At an outer portion 26 of the body 22 or main portion 18, one or more pockets 44, also referred to herein as pouches, or loops 46 are positioned as holding spaces 24 for a variety of tools, supplies, or other objects. The embodiment of FIG. 1 shows one large central pocket 44 formed from a polypropylene material by stitching, attaching, or other coupling at two ends to the body 22 with a closed lower end to retain, hold, or store objects, such as tools or supplies. Several loops 46 are formed on both sides of the pocket 44 by one or more strips of elastic material that is stitched, attached, or otherwise coupled to the body 22 at several coupling locations, as shown in FIG. 1. The elastic material allows the loops 46, which have an open upper end and open lower end, to securely retain or hold a variety of smaller tools or objects. The preferred embodiment of the present disclosure further includes multiple loops 46 at the upper portion 20 with a pocket 44 formed at the top edge of the holding member 14.

Figure 4:
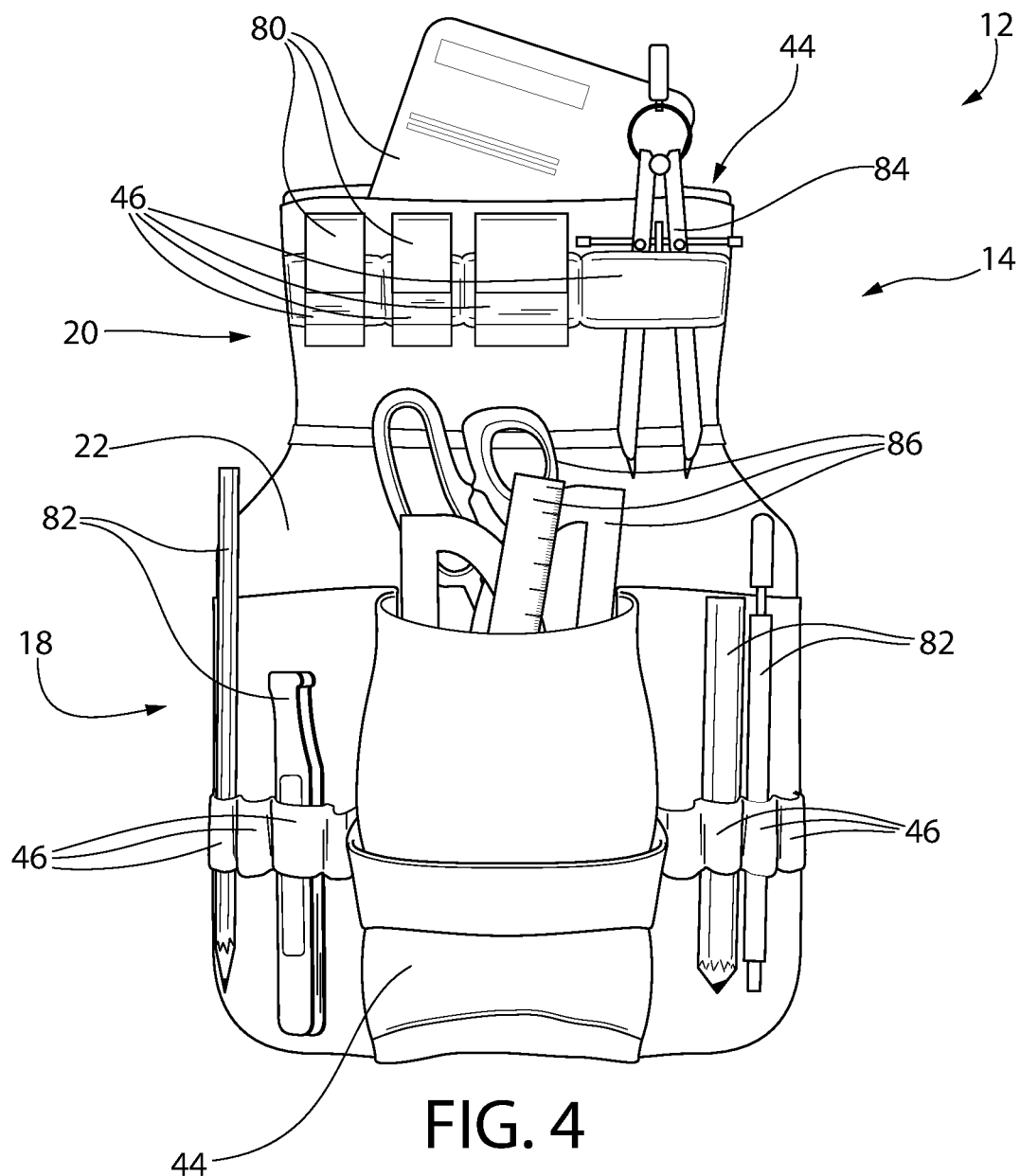
FIG. 4 is a front perspective view of a holding member or removable member of an attachment assembly in accordance with aspects of the present disclosure.

Referring now to FIG. 4, the holding member 14 is shown storing, retaining, or holding a variety of objects. The pocket 44 at the main portion 18 is large enough to accommodate uniquely shaped or sized objects 86, such as scissors, a ruler or other tools. Loops 46 formed on either side of the pocket 44 at the main portion are elastic to releasably secure objects 82 such as pencils, knives, tweezers, or other similar tools. At the upper portion 20, the pocket 44 can hold, store, retain, or otherwise support objects such as a squeegee 80. Additionally, a series of loops 46 at the upper portion 20 supports smaller squeegees 80 or other objects or tools 84 of similar size or shape, as shown in FIG. 4.

Referring now to FIG. 2, the back side of the holding member 14 of the attachment assembly 12 is shown. At the upper portion 20, a first coupling member 30 includes one or more magnets, which in the preferred embodiment includes a row or array of three magnets that are enclosed within a saddle leather core, shown in further detail in FIG. 5. The first coupling member 30 attaches, couples, mates, is attracted to, or is otherwise designed to join a second coupling member 32 of the attachment member 16, as shown in FIG. 1.

Referring now to FIG. 3, one embodiment of the attachment member 16 is shown as a sleeve 68 having a first side portion 40 at an outer side and a second side portion 42, or first side 34 facing outward and a second side 36 facing an inner direction, such as toward a person wearing the attachment member 16. The sleeve 68 of the embodiment shown in FIG. 3 is positioned around a person's belt such that the second coupling member 32 is positioned in an outward-facing direction.

Figure 5:
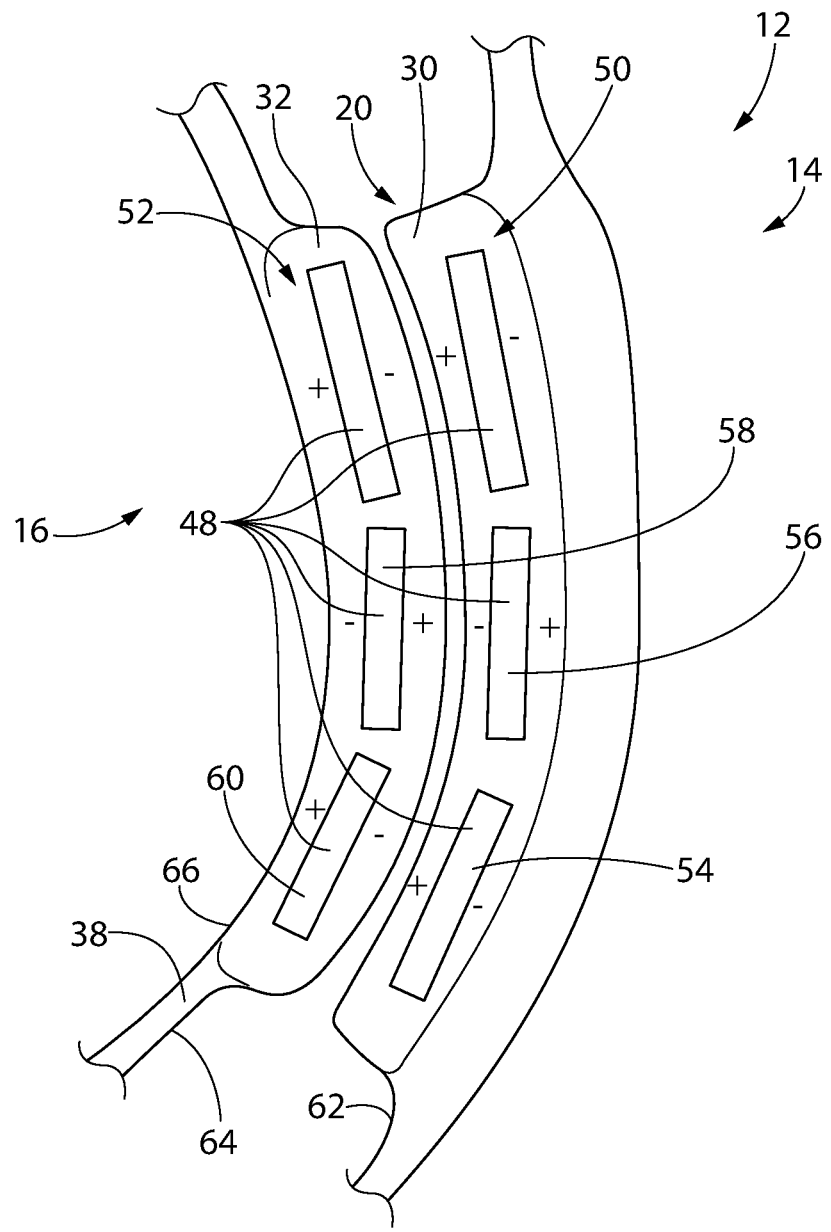
FIG. 5 is an enlarged partial cross-sectional top view of an attachment assembly in accordance with further aspects of the present disclosure.

An alternative embodiment of the attachment member 16, referenced in FIG. 5, includes the second coupling member 32 being incorporated into a belt 38. Further alternative embodiments may include second coupling member 32 being incorporated into another article of clothing or accessory located on a person's body, such as a shirt sleeve or a pant leg or pocket. These alternative embodiments allow direct attachment of the holding member 14 to a person rather than needing a separate article for attachment.

A craftsman uses the attachment assembly 12 of the preferred embodiment shown in FIGS. 1 and 3 by securing the attachment member 16 to his or her body, typically by threading his or her belt through the attachment member 16 and wearing the belt such that the attachment member 16 faces forward with the second coupling member 32 facing outward. The holding member 14, as shown in FIG. 1, may be initially attached to the craftsman as he or she begins work, offering ease of access to tools, supplies, and other items as needed because of the convenient location. As the work surface or nature of the work requires the craftsman to move frequently to different and often more restrictive areas, the holding member 14 may be quickly detached from the attachment member 16 and reattached to a work piece or surface, such as a metallic vehicle panel, a work bench, or other surface comprised of a ferrous or other material to which the magnet(s) of the first coupling member 30 are capable of attracted. After reattachment, the holding member 14 may be again detached and reattached to a new surface as needed to provide a different, user-preferred method or location of access to the objects of the holding member 14 as the craftsman performs his or her work.

Referring now to FIG. 5, a top view of an embodiment of the attachment assembly 12 is shown. The first coupling member 30 of the holding or removable member 14 of the embodiment shown in FIG. 5 includes three magnets 48 configured in a first array 50. An inner side 62 of the removable member 14 faces the attachment member 16. The attachment member 16 of the embodiment shown in FIG. 5 is a belt 38 or other clothing article or accessory housing the second coupling member 32 having three magnets 48 configured in a second array 52. An inner side of the attachment member 16 faces the person wearing the belt 48 while an outer side 64 faces the removable member 14 such that the polarity of the first array 50 of magnets and the second array 52 of magnets permits attraction between the attachment member 16 and the removable member 14.

As shown in the embodiment of FIG. 5, a first magnet in a first polarity configuration 54 is positioned in the first array 50 adjacent a second magnet in a second polarity configuration 56 different from said first polarity configuration 54. In the second array 52, a third magnet in the second polarity configuration 58 is positioned adjacent to a fourth magnet in the first polarity configuration 60 such that the first and second magnets 54, 56 are properly attracted to the third and fourth magnets 58, 60.

The particular configuration of each magnet 48 may be varied so long as each of the magnets 48 positioned in the first array 50 is attracted to each correspondingly positioned magnet 48 of the second array 52. As can be expected, there are many possible configurations of mated arrays as determined by the number of magnets 48 in each array. Accordingly, the number of configurations is 2n where n is the number of magnets in each array. In the embodiment shown in FIG. 5, there are eight configurations. However, any number of magnets may be used to increase or decrease the number of potential configurations, and any array shape or design may be used to create the mated first array 50 and second array 52. The variety of polarity configurations allows for customization or organization opportunity as a particular removable member 14 may only properly couple with a correct attachment member 16 due to the unique, matching configuration of the magnets of each. Further, the first coupling member 30 or the second coupling member 32 may not contain magnets, or ferromagnetic materials. If there are one or more magnets 48, in an array or otherwise, incorporated as the first coupling member 30, the second coupling member 32 need only comprise a ferrous or other material to which the magnet(s) are capable of attracted, and vice versa.

In addition to offering a customizable polarity array, the rows or arrays of multiple magnets 48 of the first coupling member 30 and second coupling member 32 offer structural flexibility. Any number of magnets may be incorporated into an array to form a curve or other non-linear or non-planar surface for attachment against a person's body or another surface that is not flat while still being able to hold relatively heavy items. Ferromagnetic materials, such as the strong magnets used in the embodiments described in the present disclosure, are hard, brittle materials with very little ductility or flexibility. As shown in FIG. 5, the multiple magnets 48 split into individual arrays 50, 52 utilize the large surface area of the entire magnetic array while allowing flexibility with the attachment member 16, such as the belt 38. The belt 38 having the split, segmented, or arrayed magnets 48 of the second coupling member 32 benefits from the ability to bend, flex, or otherwise form around a person's body. In addition to the removable member 14, other items capable of being attracted to the second coupling member 32 may be secured to the attachment member, the belt incorporating magnets 48, or other article incorporating the magnets 48 of the second coupling member 32, such as a dog treat container or a legally concealed weapon. Similarly, the split, segmented, or arrayed magnets 48 of the removable member 14 allow secure coupling to the attachment member 16, as well as to any shape, size, or type of exterior surface, such as the varied geometries of vehicle body panels.

Figure 6:
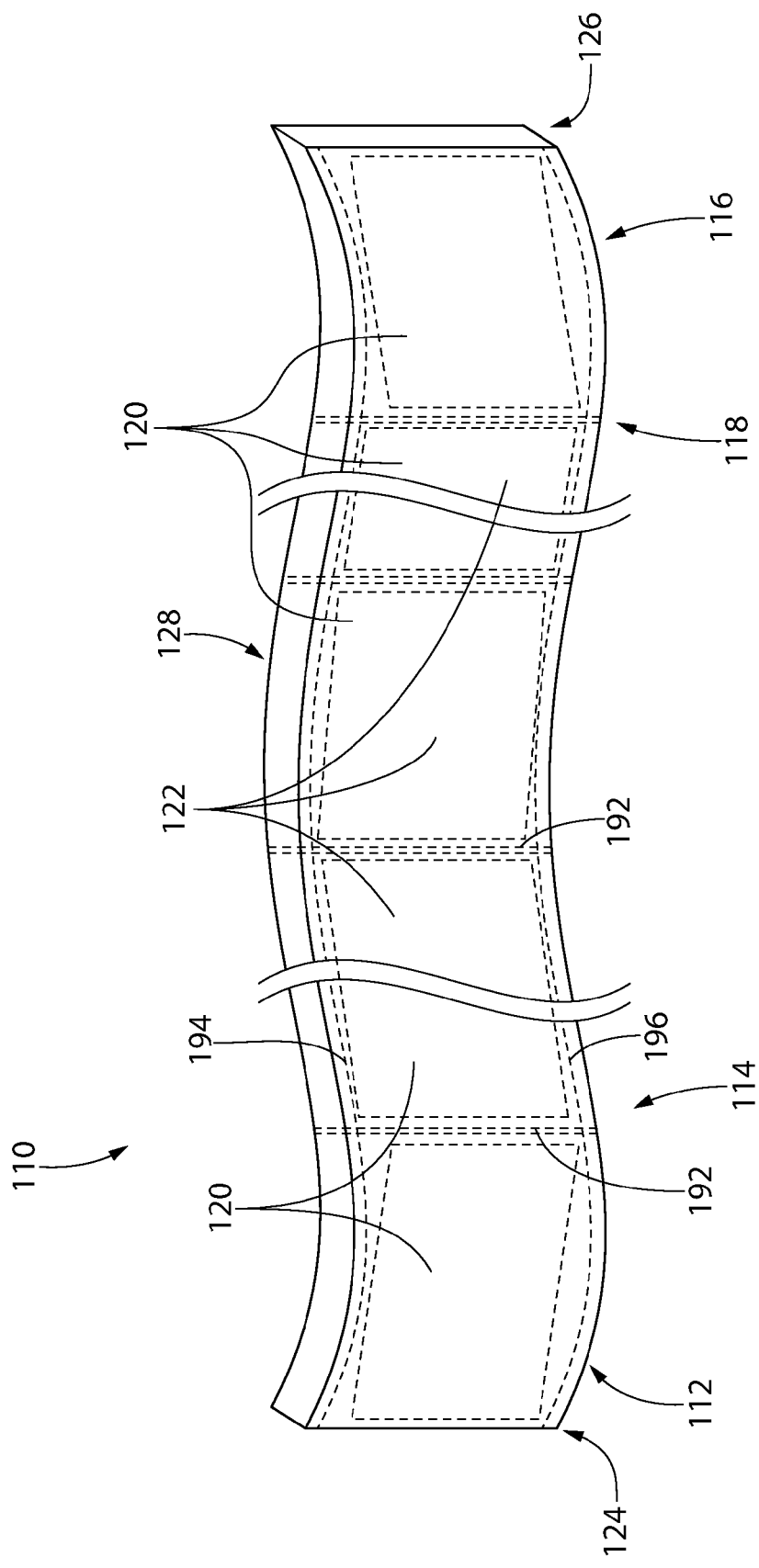
FIG. 6 is a perspective view of a magnetic belt assembly in accordance with aspects of the present disclosure.
Figure 9:
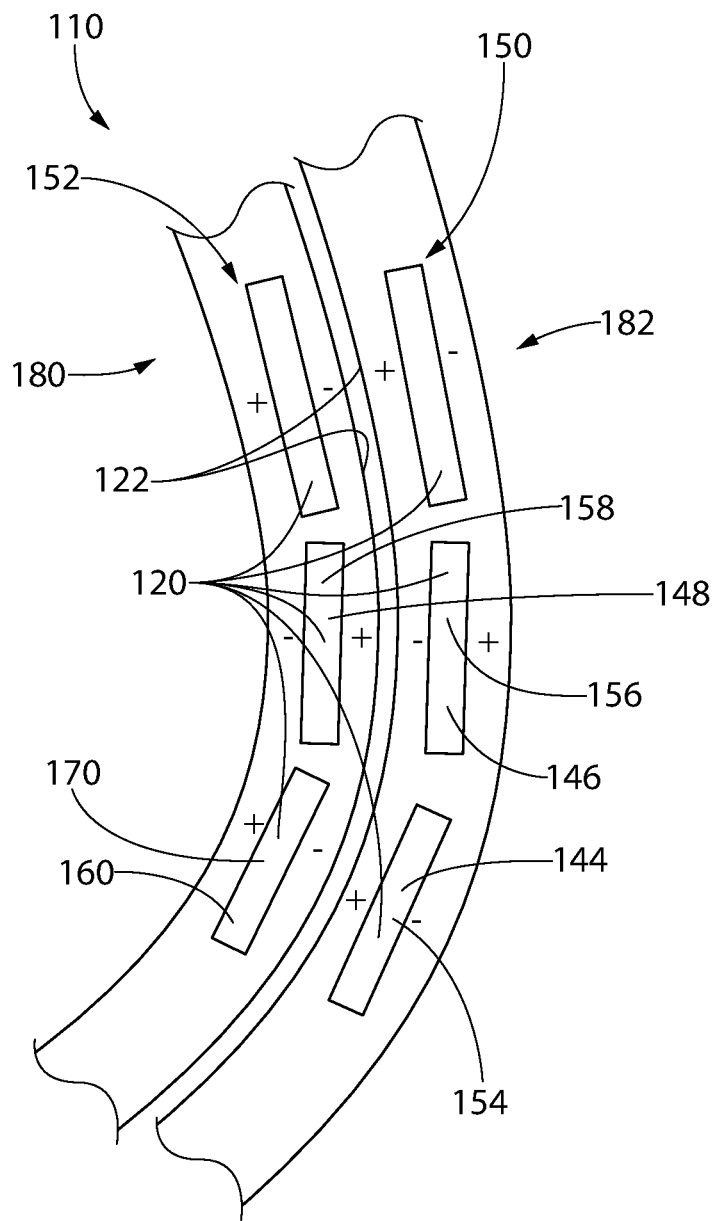
FIG. 9 is a cross sectional view of a magnetic belt assembly in accordance with aspects of the present disclosure.

Referring now to FIG. 6, a magnetic belt assembly 110 is provided in accordance with one or more embodiments of the present disclosure. The belt assembly 110 includes a first belt portion 112 having a first coupling member 114 and a second belt portion 116 having a second coupling member 118. Each of the first coupling member 114 and the second coupling member 118 includes a plurality of magnets 120. Each of the magnets 120 is moveable relative to each other such that each magnet 120 of the plurality of magnets 120 is angularly positionable relative to each other magnet 120 of the plurality of magnets 120 to form a non-planar surface 122, as illustrated in FIG. 9 and described in further detail below. In one embodiment, the first belt portion 112 defines a first end 124 of the magnetic belt assembly 110. In an embodiment, the second belt portion 116 defines a second end 126 of the magnetic belt assembly 110. The magnetic belt assembly 110 of an embodiment further includes a connecting portion 128 or third belt portion of the magnetic belt assembly 110 between the first end 124 and the second end 126 of the magnetic belt assembly 110.

In one or more embodiments, multiple magnets 120 extend continuously from the first end 124 of the magnetic belt assembly 110 to the second end 126 of the magnetic belt assembly 110. In an embodiment not illustrated, one or more central or end portions of the belt assembly 110 do not include magnets 120.

The non-planar surface 122 is formed by each magnet 120 of the plurality of magnets 120 being split from each other magnet 120 of the plurality of magnets 120. Each individual magnet 120 of the plurality of magnets 120 is rigid, brittle, non-deformable, and/or otherwise inflexible in an embodiment. In an additional embodiment, one or more of the plurality of magnets 120 is individually elastic, deformable, and/or otherwise flexible.

Figure 7:
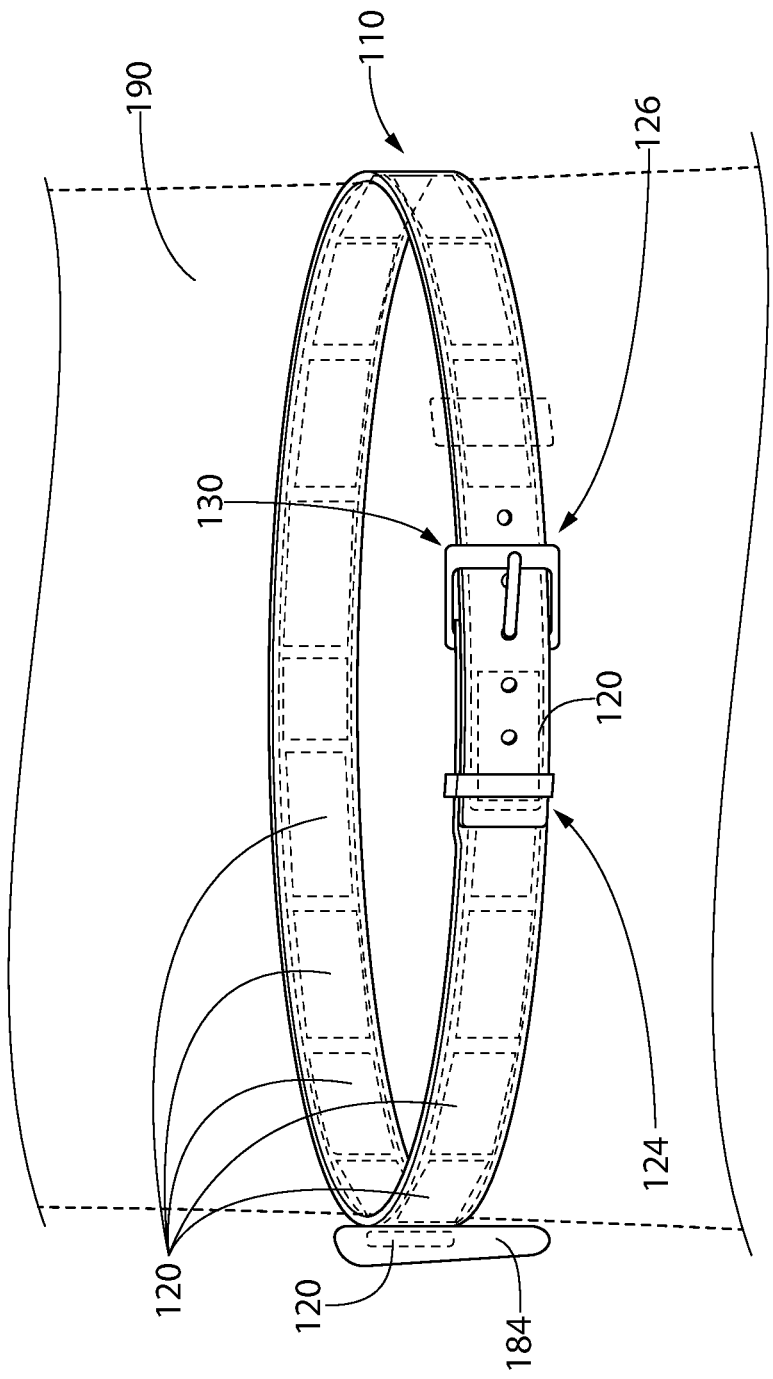
FIG. 7 is a perspective view of a magnetic belt assembly in accordance with aspects of the present disclosure.

Referring now to FIG. 7, the belt assembly 110 of an embodiment being worn by a user 190 is illustrated. The belt assembly 110 of one embodiment includes a fastening assembly 130 configured to fasten the first end 124 to the second end 126. In another embodiment, the belt assembly 110 does not include the fastening assembly 130. In any embodiment of the belt assembly 110, one or more of the magnets 120 at the first end 124 and one or more magnets 120 at the second end 126 will allow coupling of the first end 124 and the second end 126. Further, as illustrated in FIG. 7, an attached object 184, such as a pouch, tool, or any other article, includes one or a plurality of magnets 120 such that the attached object 184 is configured to be coupled to the belt assembly 110. Attachment of the attached object 184 may occur at a predetermined location or with a particular orientation, as explained in further detail below with regard to FIG. 9. In a further embodiment, the attached object 184 may be incapable of being attached to the belt assembly 110, such as at one or more locations or all locations of the belt assembly 110, by virtue of the arrangement of one or more magnets 120.

Figure 8:
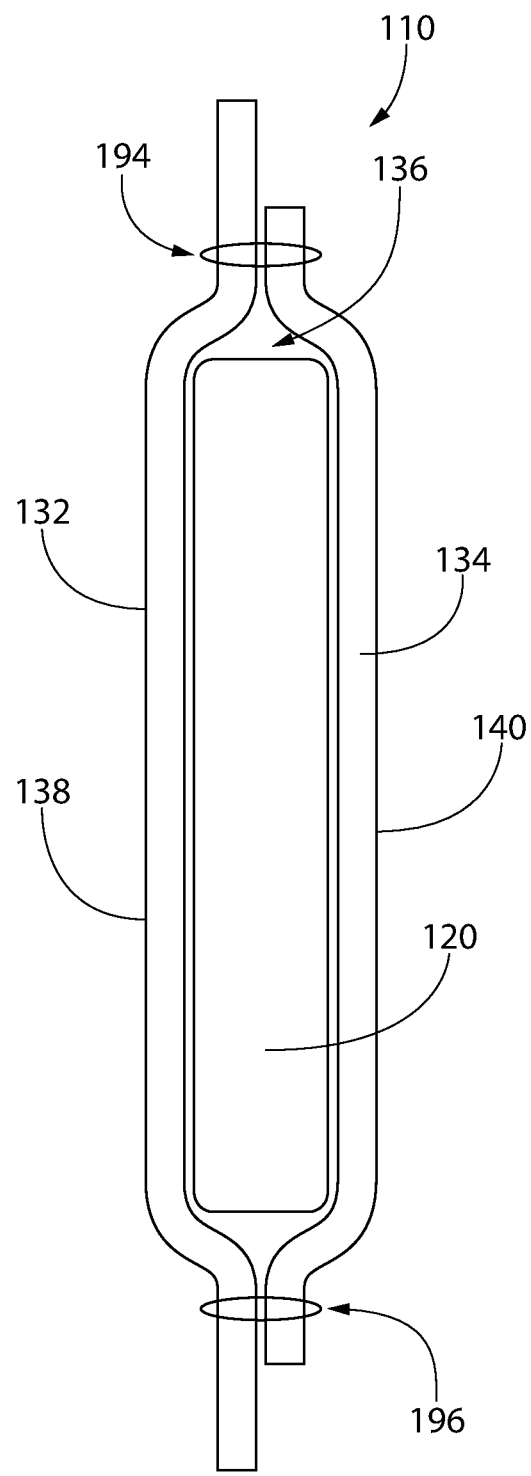
FIG. 8 is a cross sectional view of a magnetic belt assembly in accordance with aspects of the present disclosure.

Referring now to FIG. 8, the belt assembly 110 of one embodiment includes a first layer 132 and a second layer 134. The first layer 132 is coupled to the second layer 134 to embed one or more magnets 120, including magnets 120 of the first coupling member 114 and/or the second coupling member 118, therebetween. In an embodiment, an internal cavity 136 is formed between the first layer 132 and the second layer 134. The internal cavity 136 is formed by the first layer 132 defining a first planar side 138 of the magnetic belt assembly 110 and being coupled to the second layer 134 defining a second planar side 140 of the magnetic belt assembly 110.

Referring again to FIG. 6 with continuing reference to FIG. 8, in one embodiment, the first layer 132 is coupled to the second layer 134 between two adjacent magnets 120 such as by sewing, adhesive, integral formation, or one or more fasteners in non-limiting examples. In one non-limiting example, the first layer 132 is sewn to the second layer 134 at locations 192 between all adjacent magnets 120 in the belt assembly 110. Alternatively, the internal cavity 136 extends continuously from the first end 124 of the magnetic belt assembly 110 to the second end 126 of the magnetic belt assembly 110 in an embodiment. In one embodiment, the first layer 132 and the second layer 134 are sewn together continuously, such as at, near, or along a top edge 194 and a bottom edge 196, from the first end 124 to the second end 126 to form the internal cavity 136. In one embodiment, the first layer 132 is not coupled to the second layer 134 between two adjacent magnets 120 such that one or more magnets 120 are capable of moving lengthwise through the internal cavity 136. In an embodiment not illustrated, the first layer 132 is coupled to the second layer 134 between two adjacent magnets 120 in a first area of the belt assembly 110 while the first layer 132 is not coupled to the second layer 134 between two adjacent magnets 120 in another area.

Referring now to FIG. 9, an embodiment similar to the embodiment described above with regard to FIG. 5 is illustrated. A top cross sectional view is illustrated of one embodiment that includes a first portion 180, such as the first end 124 or another portion of the belt assembly 110, being coupled to a second portion 182, such as the second end 126 or another portion of the belt assembly 110, by the plurality of magnets 120. Alternatively, as illustrated in FIG. 7, the first portion 180 or the second portion 182 is an attached object 184, such as a pouch, tool, or any other article to name non-limiting examples, having one or a plurality of magnets 120 for coupling to the belt assembly 110. Each magnet 120 of the plurality of magnets 120 is arranged in a varied polarity array 150 such that two magnets 120 that are angularly positionable to form the non-planar surface 122 are positioned in the array 150 with reversed polarity relative to the other. In one non-limiting example, a first magnet 144 in a first polarity configuration 154 is positioned in the first array 150 adjacent a second magnet 146 in a second polarity configuration 156 different from the first polarity configuration 154. In a second array 152, a third magnet 148 in the second polarity configuration 158 is positioned adjacent to a fourth magnet 170 in the first polarity configuration 160 such that the first and second magnets 144, 146 are properly attracted to the third and fourth magnets 148, 170.

The particular configuration of each magnet 120 may be varied so long as each of the magnets 120 positioned in the first array 150 is attracted to each correspondingly positioned magnet 120 of the second array 152. As can be expected, there are many possible configurations of mated arrays as determined by the number of magnets 120 in each array. Accordingly, the number of configurations is $2^n$ where n is the number of magnets in each array. In the embodiment shown in FIG. 9, there are eight configurations. However, any number of magnets may be used to increase or decrease the number of potential configurations, and any array shape or design may be used to create the mated first array 150 and second array 152. The variety of polarity configurations allows for a customization or organization opportunity as a particular object 184 may properly couple at a predetermined location of the belt assembly 110 due to the unique, matching configuration of the magnets of each. Further, the variety of polarity configurations allows for the belt assembly 110 to attach to itself and fasten at a predetermined location to secure itself to a particular person or around an object. Further, the first coupling member 114 or the second coupling member 118 may not contain magnets, or ferromagnetic materials. For example, if there are one or more magnets 120, in an array or otherwise, incorporated as the first coupling member 114, the second coupling member 118 need only comprise a ferrous or other material to which the magnet(s) 120 are capable of attracted, and vice versa.

In addition to offering a customizable polarity array, the rows or arrays of multiple magnets 120 of the first coupling member 114 and second coupling member 118 offer structural flexibility. Any number of magnets may be incorporated into an array to form a curve or other non-linear or non-planar surface for attachment against a person's body or another surface that is not flat while still being able to hold relatively heavy items. Ferromagnetic materials, such as the strong magnets used in the embodiments described in the present disclosure, are hard, brittle materials with very little ductility or flexibility. As shown in FIG. 9, the multiple magnets 120 split into individual arrays 150, 152 utilize the large surface area of the entire magnetic array while allowing flexibility with the belt assembly 110. The belt assembly 110 having the split, segmented, or arrayed magnets 120 of the second coupling member 118 benefits from the ability to bend, flex, or otherwise form around a person's body. In addition to the object 184, other items capable of being attracted to the belt assembly 110, or another article coupled to the belt assembly 110 and incorporating the magnets 120, such as a dog treat container or a legally concealed weapon. Similarly, the split, segmented, or arrayed magnets 120 of the belt assembly 110 allow secure coupling to any shape, size, or type of surface, such as the varied geometries of vehicle body panels.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A magnetic belt assembly, comprising:
   a first belt portion having a first coupling member; and
   a second belt portion having a second coupling member, wherein each of the first coupling member and the second coupling member comprises a plurality of magnets that is structurally flexible such that each magnet of the plurality of magnets is angularly positionable relative to each other magnet of the plurality of magnets to form a non-planar surface.

2. The magnetic belt assembly of claim 1, wherein the first belt portion defines a first end of the magnetic belt assembly.

3. The magnetic belt assembly of claim 2, wherein the second belt portion defines a second end of the magnetic belt assembly.

4. The magnetic belt assembly of claim 2, wherein the second belt portion defines a connecting portion of the magnetic belt assembly between the first end and a second end of the magnetic belt assembly.

5. The magnetic belt assembly of claim 1, wherein the first belt portion includes a first layer and a second layer, the first layer being coupled to the second layer to embed the first coupling member therebetween.

6. The magnetic belt assembly of claim 5, wherein the second belt portion includes the first layer and the second layer, the first layer being coupled to the second layer to embed the second coupling member therebetween.

7. The magnetic belt assembly of claim 5, wherein the first layer is coupled to the second layer between two adjacent magnets.

8. The magnetic belt assembly of claim 5, further comprising an internal cavity between the first layer and the second layer, the internal cavity extending continuously from the first end of the magnetic belt assembly to the second end of the magnetic belt assembly.

9. The magnetic belt assembly of claim 8, wherein the first layer and the second layer are sewn together continuously from the first end to the second end to form the internal cavity.

10. The magnetic belt assembly of claim 1, wherein the plurality of magnets extend from a first end of the magnetic belt assembly to a second end of the magnetic belt assembly.

11. The magnetic belt assembly of claim 1, wherein the non-planar surface is formed by each magnet of the plurality of magnets being split from each other magnet of the plurality of magnets.

12. The magnetic belt assembly of claim 11, wherein each magnet of the plurality of magnets is arranged in a varied polarity array such that two magnets that are angularly positionable to form a non-planar surface are positioned in the array with reversed polarity relative to the other.

13. The magnetic belt assembly of claim 11, wherein each of the plurality of magnets is inflexible.

14. A magnetic belt assembly, comprising;
a first belt portion defining a first end of the magnetic belt assembly and having a first coupling member;
a second belt portion defining a second end of the magnetic belt assembly and having a second coupling member; and
a third belt portion connecting the first end of the magnetic belt assembly to the second end of the magnetic belt assembly and having a third coupling member, wherein each of the first coupling member, the second coupling member, and the third coupling member comprises a plurality of magnets that is structurally flexible such that each magnet of the plurality of magnets is angularly positionable relative to and split from each other magnet of the plurality of magnets to form a non-planar surface.

15. The magnetic belt assembly of claim 14, further comprising an internal cavity extending from the first end of the magnetic belt assembly to the second end of the magnetic belt assembly.

16. The magnetic belt assembly of claim 15, wherein the plurality of magnets are disposed within the internal cavity and extend from the first end of the magnetic belt assembly to the second end of the magnetic belt assembly.

17. The magnetic belt assembly of claim 16, wherein the internal cavity is formed by a first layer defining a first planar side of the magnetic belt assembly and being coupled to a second layer defining a second planar side of the magnetic belt assembly.

18. The magnetic belt assembly of claim 16, wherein a first layer and a second layer are sewn together continuously from the first end to the second end to form the internal cavity.

19. The magnetic belt assembly of claim 14, wherein each magnet of the plurality of magnets is arranged in a varied polarity array such that two magnets that are angularly positionable to form the non-planar surface are positioned in the array with reversed polarity relative to the other.

20. The magnetic belt assembly of claim 14, wherein each magnet of the plurality of magnets is inflexible.

* * * * *